(12) United States Patent
Beek et al.

(10) Patent No.: US 9,683,057 B2
(45) Date of Patent: *Jun. 20, 2017

(54) PROCESS FOR MODIFYING POLYMERS

(71) Applicant: Akzo Nobel Chemicals International B.V., Arnhem (NL)

(72) Inventors: Waldo Joseph Elisabeth Beek, Deventer (NL); Auke Gerardus Talma, Bathmen (NL)

(73) Assignee: Akzo Nobel Chemicals International B.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/034,678

(22) PCT Filed: Oct. 31, 2014

(86) PCT No.: PCT/EP2014/073416
§ 371 (c)(1),
(2) Date: May 5, 2016

(87) PCT Pub. No.: WO2015/067531
PCT Pub. Date: May 14, 2015

(65) Prior Publication Data
US 2016/0264688 A1   Sep. 15, 2016

(30) Foreign Application Priority Data

Nov. 7, 2013 (EP) .................................. 13191967

(51) Int. Cl.
| | | |
|---|---|---|
| C08K 5/28 | (2006.01) | |
| C08K 5/3415 | (2006.01) | |
| C08L 23/36 | (2006.01) | |
| C08L 51/04 | (2006.01) | |
| C08F 8/30 | (2006.01) | |
| C08L 51/00 | (2006.01) | |
| C08L 51/06 | (2006.01) | |
| C08C 19/22 | (2006.01) | |

(52) U.S. Cl.
CPC ............... *C08F 8/30* (2013.01); *C08K 5/28* (2013.01); *C08K 5/3415* (2013.01); *C08L 23/36* (2013.01); *C08L 51/003* (2013.01); *C08L 51/04* (2013.01); *C08L 51/06* (2013.01); *C08C 19/22* (2013.01)

(58) Field of Classification Search
None
See application file for complete search history.

(56) References Cited

U.S. PATENT DOCUMENTS

| | | |
|---|---|---|
| 3,205,206 A | 9/1965 | Marcantonio et al. |
| 3,631,182 A | 12/1971 | Breslow |
| 4,287,294 A | 9/1981 | Rubner et al. |
| 4,329,556 A | 5/1982 | Rubner et al. |
| 4,352,938 A | 10/1982 | Breslow |
| 5,883,145 A * | 3/1999 | Hurley ............... C08F 8/00 264/232 |
| 6,313,314 B1 | 11/2001 | Cheng et al. |

FOREIGN PATENT DOCUMENTS

| | | |
|---|---|---|
| EP | 0019122 A2 | 11/1980 |
| EP | 0019726 A1 | 12/1980 |
| EP | 0143380 A2 | 6/1985 |
| JP | 4372662 B2 | 11/2009 |
| WO | 2012/116250 A1 | 8/2012 |

OTHER PUBLICATIONS

Yang, S. et al. Polymer Testing vol. 27 pp. 957-963 publihed Dec. 2008.*
Stuart A. Bateman, et al., "Sulfonyl Azides—An Alternative Route to Polyolefin Modification," Journal of Applied Polymer Science, vol. 84, (2002), pp. 1395-1402.
A.J. Zielinska, Cross-Linking and Modification of Saturated Elastomers Using Functionalized Azides, Dissertation, University of Twente, Jul. 1, 2011 (1 of 2, cover page to p. 78).
A.J. Zielinska, Cross-Linking and Modification of Saturated Elastomers using Functionalized Azides, Dissertation, University of Twente, Jul. 1, 2011 (2 of 2, pp. 79-165).
Anon, Research Disclosure (1999), 427 (Nov.), p. 1472 (No. 427060).
J.E. Mark et al., The Science and Technology of Rubber, Third Edition, 2005, pp. 388-391.
Elisa Passaglia et al., "Effect of Structure of Functionalizing Molecules on the Inter-Macromolecular Reactions and Blending of Poly(ethylene-co-propylene) (EPM) With Poly (6-aminohexanoic Acid) (PA6)", Helvetica Chimica ACTA, vol. 89, No. 8, Aug. 30, 2006, pp. 1596-1609.
J.K. Jorgensen et al., "Introduction of Long-Chain Branches in Linear Polyethylene by Light Crosslinking with 1,3-Benzenedisulfonyl Azide," Polymer, 46, (2005), pp. 12256-12266.
Search Report of EP 13191967.2 dated Feb. 24, 2014.
International Search Report and Written Opinion of PCT/EP2014/073416, mailed Jan. 9, 2015.

* cited by examiner

*Primary Examiner* — Irina S Zemel
*Assistant Examiner* — Jeffrey Lenihan
(74) *Attorney, Agent, or Firm* — McDonnell Boehnen Hulbert & Berghoff LLP

(57) ABSTRACT

Process for modifying a polymer in the absence of elemental sulfur amounts larger than 0.5 phr, comprising the steps of a. mixing said polymer with a maleimide-functionalized mono-azide at a temperature in the range 80-250° C. to form a functionalized polymer, and b. thermally treating the functionalized polymer at a temperature in the range 50-270° C.

14 Claims, No Drawings

PROCESS FOR MODIFYING POLYMERS

This application is a national stage filing under 35 U.S.C. §371 of PCT/EP2014/073416, filed Oct. 31, 2014, which claims priority European Patent Application No. 13191967.2, filed Nov. 7, 2013, the contents of which are each incorporated herein by reference in their entireties.

The present invention relates to a process for modifying polymers without requiring peroxide or sulfur.

Elastomers are conventionally crosslinked by using elemental sulfur combined with several sulfur vulcanization accelerators. Crosslinking with peroxides, however, gains more territory the last couple of years. Advantages of peroxide crosslinking are the better reversion resistance, better heat and chemical resistance and better compression set compared to sulfur-crosslinked systems.

Polyolefins like polyethylene are commonly cured with peroxides. Sulfur-based cure systems are generally not utilized for polyolefins because their processing temperatures are close to or above the onset of cure of the sulfur cure package. In addition, discoloration by additives and the smell of sulfur components are highly undesirable in polyolefin applications.

Polypropylene, however, is known to degrade upon peroxide treatment and can also not be crosslinked with sulfur because of the absence of unsaturations in the polymer.

Peroxides are used to enhance the melt strength of polypropylene by creating long chain branches.

A further disadvantage of both sulfur- and peroxide treatments is that organic volatiles are formed during the process. In addition, the components of the cure systems, i.e. the sulfur, the accelerators, the peroxides, and decomposition products thereof, often tend to migrate to the surface of the treated polymer article (this is called "blooming"), which can cause undesirable contact contamination to skin or other surfaces.

It would therefore be desirable to provide a process for polymer modification without requiring peroxide, nor sulfur or sulfur-containing compounds.

Preferably, such a process would also be devoid of the release of organic volatiles and blooming.

This object is achieved by the process according to the present invention, which does not require the use of peroxide, sulfur, or sulfur accelerators and in which nitrogen may be the only volatile component formed.

The process involves the functionalisation of the polymer backbone. During this functionalisation, nitrogen is released. The second step of the process involves a thermal treatment, during which no additional volatiles need to be released.

The process according to the present invention relates to a process for modifying a polymer in the absence of elemental sulfur amounts larger than 0.5 phr, comprising the steps of
a. mixing said polymer with a maleimide-functionalized mono-azide at a temperature in the range 80-250° C. to form a functionalised polymer, and
b. thermally treating the functionalised polymer at a temperature in the range 150-270° C.

Polymers that can be suitably modified by this method include elastomers, chain saturated polymers, and polyesters.

Examples of elastomers are natural rubber (NR), styrene butadiene rubber (SBR), butadiene rubber (BR), butyl rubber (IIR), ethylene propylene copolymer elastomer (EPM), ethylene propylene diene terpolymer elastomer (EPDM), and ethylene vinylacetate copolymer (EVA).

Chain saturated polymers include polyolefins. Suitable polyolefins are polystyrene, polyethylene (LDPE, LLDPE, HDPE) and polypropylene (PP), both the homopolymers and co-polymers thereof. Examples of such co-polymers are polyolefin elastomers (POE), which are based on polyethylene-octene or butane copolymers.

Examples of polyesters are polylactic acid (i.e. polylactide, PLA) and poly(hydroxyalkanoates like poly(hydroxybutyrate), poly(butylene succinate), polyglycolide, and poly(ε-caprolactone).

Maleimide-functionalized monoazides that can be used in the process of the present invention preferably have the formula:

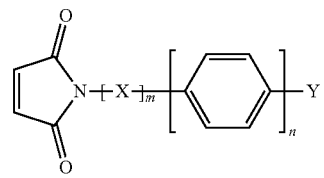

wherein Y is

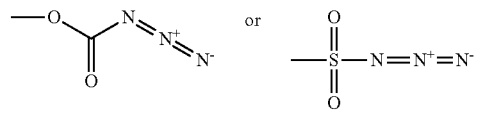

m is 0 or 1, n is 0 or 1, n+m=1 or 2, preferably 1, and X is a linear or branched, aliphatic or aromatic hydrocarbon moiety with 1-12 carbon atoms, optionally containing heteroatoms.

When X contains heteroatoms, it preferably has one of the following structures:

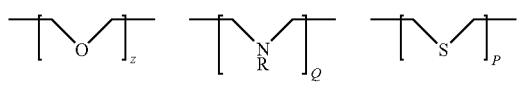

wherein Z, Q and P are integers ranging from 1 to 6 and R is selected from the group consisting of H, alkyl, aryl, phenyl, and substituted phenyl groups.

A particularly preferred monoazide is 4-(2,5-dioxo-2,5-dihydro-1H-pyrrol-1-yl)benzenesulfonyl azide:

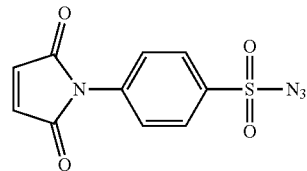 [SMILES: [N-]=[N+]=NS(=O)(=O)c1ccc(N2C(=O)C=CC2=O)cc1]

Functionalisation step a) can be performed in any suitable equipment capable of mixing polymers at a temperature in the range 80-250° C. Examples of such equipment are internal batch mixers (often called Banbury mixers), two-roll-mills (when heating of the rolls is possible), extruders, and the like. The result of the functionalisation is a polymer containing maleimide functionalities.

The polymer and the maleimide-functional azide are preferably mixed in a weight ratio of 0.01-20 phr, more preferably 0.05-10 phr, and most preferably 0.1-5 phr. The term "phr" means: weight parts per hundred weight parts of polymer.

In addition to the polymer and the maleimide-functional azide, radical scavengers and antioxidants may be added to the mixture. Examples of radical scavengers are t-butyl hydroquinone (TBHQ), 2,2,6,6-tetramethylpiperidinooxy (TEMPO), and 4-hydroxy-2,2,6,6-tetramethylpiperidin-1-oxyl (OH-TEMPO). Examples of suitable antioxidants are sterically hindered polynuclear phenols (e.g. Vulkanox® SKF, Vulkanox® DS, Vulkanox BKF, Irganox 1010), aminic antioxidants (e.g. Flectol TMQ), diphenyl diamin based antioxidants (e.g. Santonox 6PPD), and phosphites (e.g. Weston TNPP)

The functionalisation is performed at a temperature in the range 80-250° C., preferably 90-230° C., more preferably 100-200° C., and most preferably 110-180° C. The temperature of choice depends on the type of polymer and the type of azide.

Sulfonyl azides (azidosulfonates) typically start to decompose into reactive nitrene moieties around 130° C. with a peak around 180° C.; azidoformates start to decompose above 110° C. with a peak at 160° C. The formed nitrene moieties react with the polymer, resulting in grafting of the nitrene onto the polymer.

One additional mechanism in which azides can react with unsaturated polymers is via the so-called "click" mechanism, which can occur below the decomposition temperature of the azide. On fully saturated polymers this "click" mechanism will not occur.

The preferred reaction time is 1-120 minutes, more preferably 1-60 minutes, and most preferably 2-30 minutes.

During or after the functionalisation step, the polymer can be shaped in a desired form. This shaping can be performed in a mould (compression, injection or transfer moulding); an extruder (where shaping dies can be installed at the extruder head); or a calendar (to process a polymer melt into a sheet or thin film). Also a so-called thermoforming process can be used to form shapes from foils or sheets of polyolefins.

The functionalised polymer is subsequently thermally treated at a temperature in the range 150-270° C., preferably 160-250° C., and most preferably 170-220° C. Because both steps of the process of the present invention are thermal processes with a radical mechanism, the two steps can be performed as one; that is: without separation between two distinct steps.

However, if separation between the two steps is desired, this can be done by performing each step at a different temperature, or by adding radical scavengers and/or antioxidants in step a) and/or anionic polymerization catalysts, C-C initiators, or peroxides in step b).

Examples of radical scavengers and antioxidants have been listed above. Examples of anionic polymerization catalysts are triethylenediamine (DABCO), polymeric 1,2-dihydro-2,2,4-trimethylquinoline (Antioxidant TMQ), and 1,8-diazabicyclo[5.4.0]undec-7-ene (DBU). Antioxidant TMQ (1,2-Dihydro-2,2,4-trimethylquinoline) can act both as radical scavenger and anionic polymerization catalyst.

Examples of suitable peroxides are t-butyl cumyl peroxide, 3,6,9-triethyl-3,6,9,-trimethyl-1,4,7-triperoxonane, dicumyl peroxide, di(t-butylperoxyisopropyl) benzene, and 2,5-dimethyl-2,5-di(tert-butylperoxy)hexane.

A suitable C-C initiator is benzopinacole (1,1,2,2-tetraphenyl-1,2-ethanediol).

The process of the present invention results in a rheology change of the polymer. The resulting modified polymer can be fully crosslinked or be rheology modified. With rheology modification is meant that the rheological properties, e.g. the melt-flow-index, of the polymer are changed.

For polypropylene, a desired rheology modification would be a decrease in melt flow index by creating branches. Branched polypropylene is used in applications where a high melt strength of polypropylene is required, such as a thermoforming processes. Whether a functionalized polymer becomes rheology modified or crosslinked depends largely on the type of polymer. In general, polypropylene is branched and an ethylene propylene copolymer is crosslinked.

Although the process of the present invention does not exclude the presence of a peroxide, such presence is not required. Preferably, the process of the invention is performed in the absence of a peroxide.

The process of the present invention also does not exclude the presence of a sulfur vulcanization accelerator, i.e. compounds conventionally used to accelerate sulfur cure. However, such presence is not required. Preferably, the process of the invention is performed in the absence a sulfur vulcanization accelerator.

The process of the present invention does also not require the use of elemental sulfur. However, it is allowed to add some sulfur, as long as it is not more than 0.5 phr, preferably not more than 0.2 phr, even more preferably not more than 0.1 phr. Most preferably, no elemental sulfur is present during the process.

EXAMPLES

Example 1

A natural rubber-based compound comprising the ingredients listed in Table 1 was used in this Example. This rubber compound is suitable for truck tire tread compounds.

TABLE 1

| NR base compound | |
|---|---|
| NR SVR-3L | 100 |
| Carbon black FEF-N550 | 30 |
| Carbon black HAF-N330 | 20 |
| distilled aromatic extract oil (VivaTec 500) | 8 |
| Anti-ozonant (Santoflex ™ 6PPD) | 2 |
| Antioxidant TMQ | 1 |

47 grams of the compound were mixed on a two roll mill with 0.93 grams of maleimide sulfonylazide (4-(2,5-dioxo-2,5-dihydro-1H-pyrrol-1-yl)benzenesulfonyl azide). This equals 3.2 phr azide. The mixture is heat treated in a Banbury type mixer with an internal volume of 50 mL at a temperature of 120° C. for 30 minutes to graft the azide onto the NR rubber.

After grafting the azide onto the natural rubber, the compound was cured by heat treatment at 170° C. During this heat treatment, the maleimide functionalities react with each other and form a network, thereby crosslinking the rubber.

As a comparison, the same NR rubber was mixed on a two roll mill with 2.9 phr dicumyl peroxide at a temperature above 50° C.; sufficient to melt the peroxide. The resulting compound was cured by heat treatment at a 170° C. During this heat treatment the peroxide decomposes into radicals, which react with the polymer chain thereby forming a network and crosslinking the rubber.

Table 2 lists the properties of the resulting modified polymers. Listed are the scorch time (ts2; the time required to increase the torque with 0.2 Nm from the curve minimum) and the t50 and t90, i.e. the times needed to reach 50 resp. 90% of the ultimate maximal crosslink density, measured in a rheometer. The delta torque (ΔS) as measured in the rheometer is used as an indication of the crosslink density. The results show that the crosslinking behaviour of a natural rubber compound modified with 3.2 phr azide is similar to that modified with 2.9 phr dicumyl peroxide.

TABLE 2

|  | 3.2 phr azide | 2.9 phr dicumyl peroxide |
|---|---|---|
| Rheometer at 170° C. | | |
| ts2 (min) | 1.0 | 1.1 |
| t50 (min) | 0.3 | 0.4 |
| t90 (min) | 8.1 | 7.1 |
| ΔS (Nm) | 0.62 | 0.79 |
| $M_L$ (Nm) | 0.19 | 0.05 |
| $M_H$ (Nm) | 0.81 | 0.84 |
| Tensile properties after cure at 170° C. for 15 minutes | | |
| Tensile strength (N/mm2) | 19 | 18 |
| Elongation at break | 444 | 416 |

The ultimate crosslink level, as expressed by $M_H$, is comparable for both cure systems. Also the mechanical properties, as expressed by the tensile strength and elongation at break, are similar for both cure systems.

These results indicate that the process according to the present invention results in satisfactory crosslinking behaviour without production of volatiles other than nitrogen.

Example 2

A polypropylene homopolymer (Moplen HP500N) was mixed in a Banbury mixer, with maleimide sulfonylazide at a temperature of 170° C. and reacted at this temperature for 20 minutes. During this reaction, the azide was grafted onto the polypropylene. After raising the temperature to 200° C. and mixing at 200° C. for 2-3 minutes, the maleimide groups on the polymer started to react and create branches and crosslinks as is apparent from the decreased melt flow index (MFI) in Table 3.

This table shows the effect of the amount of azide added (in phr). The more azide used, the lower the MFI and the higher the crosslinking level.

Irganox® 1010 was added as a stabilizer for the polypropylene and to prevent polymerization of the maleimide groups at 170° C. Irganox® 1010 influences the crosslinking reaction between the maleimide groups, which can be observed from the penultimate entry in Table 3, where an increase in the Irganox® 1010 level led to an increase in MFI, which was most probably due to interference with the maleimide crosslinking by radical scavenging.

Crosslinking was observed by measuring torque increase at 200° C. on samples which had been mixed at 170° C. These samples showed no crosslinking at 170° C.; only after exposing to 200° C. in the rheometer they started to crosslink. The torque increase is listed in Table 3.

TABLE 3

| maleimide sulfonylazide (phr) | Irganox ® 1010 (phr) | MFI (230° C. 2016 kg) | Rheometer torque increase (dNm) |
|---|---|---|---|
| 0 | 0.1 | 12.5 | 0 |
| 0.25 | 0.1 | 5.5 | |
| 0.375 | 0.1 | 1.5 | |
| 0.5 | 0.1 | <0.5 | 0.3 |
| 0.5 | 0.5 | 8 | |
| 1 | 0.1 | No measurable MFI | 0.5 |

Example 3

An SBR-based compound comprising the ingredients listed in Table 4 was used in this Example. This rubber compound is suitable for truck tire tread compounds.

47 grams of the compound were mixed on a two roll mill with 0.93 grams of maleimide sulfonylazide (4-(2,5-dioxo-2,5-dihydro-1H-pyrrol-1-yl)benzenesulfonyl azide). This equals to 3.2 phr azide. The mixture was heat treated in a Banbury type mixer with an internal volume of 50 mL at a temperature of 120° C. for 20 minutes to graft the azide onto the SBR rubber.

After grafting the azide onto the SBR rubber, the compound was cured by heat treatment at either 170° C. or 180° C.

The experiments show that SBR can be thermally crosslinked after modification with maleimide sulfonylazide. Table 4 shows that after increasing the temperature from 170° C. to 180° C., the crosslink speed increased while the crosslink density ($M_H$) has also improved.

TABLE 4

|  | 1 | 2 |
|---|---|---|
| Buna SB 1500 | 100 | 100 |
| FEF-N550 | 30 | 30 |
| HAF-N330 | 20 | 20 |
| VivaTec 500 | 8 | 8 |
| Santoflex 6PPD | 2 | 2 |
| Antioxidant TMQ | 1 | 1 |
| TBHQ | 0.3 | 0.3 |
| maleimide sulfonylazide | 3.2 | 3.2 |
| Temperature | 170° C. | 180° C. |
| ts2 (min) | 5 | 2 |
| t50 (min) | 7 | 4 |
| t90 (min) | 23 | 17 |
| $M_L$ (Nm) | 0.29 | 0.27 |
| $M_H$ (Nm) | 0.77 | 0.92 |
| ΔS (Nm) | 0.48 | 0.65 |

The invention claimed is:

1. A process for modifying a polymer in the absence of elemental sulfur amounts greater than 0.5 phr and in the absence of a peroxide, comprising
   (a) mixing said polymer with a maleimide-functionalized mono-azide at a temperature in the range 80-250° C. to form a polymer containing maleimide functionalities, and
   (b) thermally treating the polymer containing maleimide functionalities at a temperature in the range 150-270° C.

2. The process according to claim 1 wherein the polymer is an elastomer.

3. The process according to claim 2 wherein the elastomer is natural rubber (NR), styrene butadiene rubber (SBR), butadiene rubber (BR), butyl rubber (IIR), ethylene propylene copolymer elastomer (EPM), ethylene propylene diene terpolymer elastomer (EPDM), or ethylene vinylacetate copolymer (EVA).

4. The process according to claim 1 wherein the polymer is a polyolefin.

5. The process according to claim 4 wherein the polyolefin polystyrene, polyethylene, polypropylene, or a copolymers of ethylene and/or propylene.

6. The process according to claim 1 wherein the polymer is polylactic acid.

7. The process according to claim 1 wherein the maleimide-functionalized azide has the following structure:

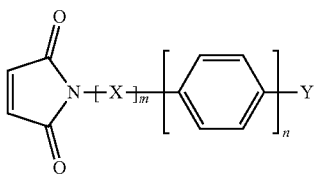

wherein Y is

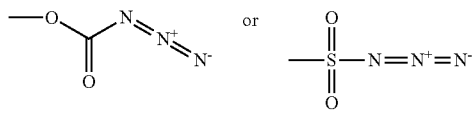

m is 0 or 1, n is 0 or 1, n+m=1 or 2, and X is a linear or branched, aliphatic or aromatic hydrocarbon moiety with 1-12 carbon atoms, optionally containing heteroatoms.

8. A process for modifying a polymer in the absence of elemental sulfur amounts greater than 0.5 phr, comprising
   (a) mixing said polymer with a maleimide-functionalized mono-azide in the absence of a peroxide at a temperature in the range 80-250° C. to form a polymer containing maleimide functionalities, and
   (b) adding an anionic polymerization catalyst, a C-C initiator, or a peroxide and thermally treating the polymer containing maleimide functionalities at a temperature in the range 150-270° C.

9. The process according to claim 8 wherein the polymer is an elastomer.

10. The process according to claim 9 wherein the elastomer is natural rubber (NR), styrene butadiene rubber (SBR), butadiene rubber (BR), butyl rubber (IIR), ethylene propylene copolymer elastomer (EPM), ethylene propylene diene terpolymer elastomer (EPDM), or ethylene vinylacetate copolymer (EVA).

11. The process according to claim 8 wherein the polymer is a polyolefin.

12. The process according to claim 11 wherein the polyolefin is polystyrene, polyethylene, polypropylene, or a copolymer of ethylene and/or propylene.

13. The process according to claim 8 wherein the polymer is polylactic acid.

14. The process according to claim 8 wherein the maleimide-functionalized azide has the following structure:

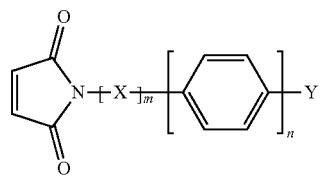

wherein Y is

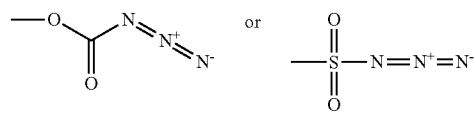

m is 0 or 1, n is 0 or 1, n+m=1 or 2, and X is a linear or branched, aliphatic or aromatic hydrocarbon moiety with 1-12 carbon atoms, optionally containing heteroatoms.

* * * * *